United States Patent Office 3,732,194
Patented May 8, 1973

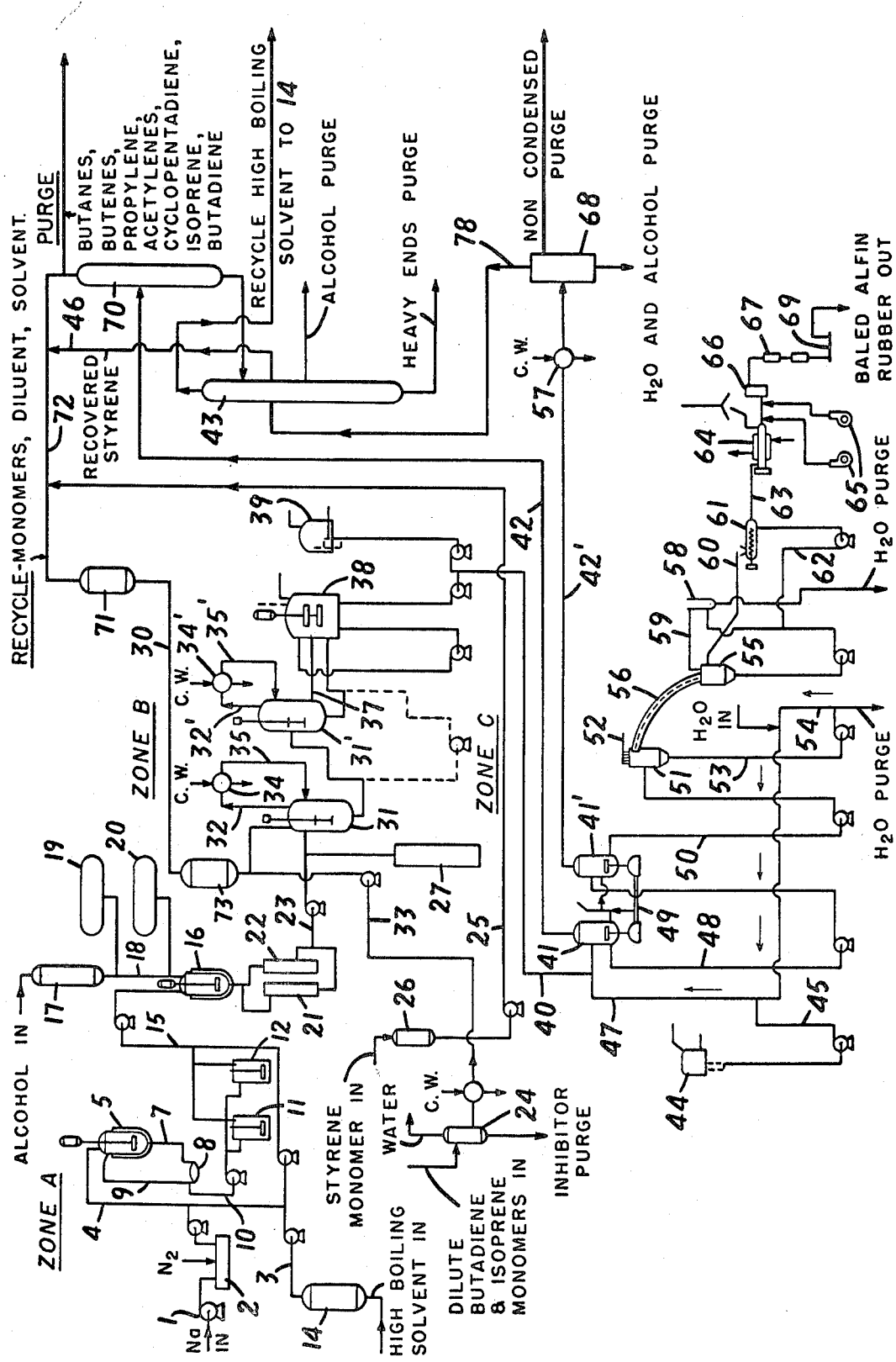

3,732,194
CONTINUOUS PROCESS FOR THE PRODUCTION OF ALFIN POLYMERS
Theodore B. Baba, Hillsdale, N.J., assignor to National Distillers and Chemical Corporation, New York, N.Y.
Continuation-in-part of applications Ser. No. 672,882, Oct. 4, 1967, and Ser. No. 809,228, Mar. 31, 1969. This application Feb. 20, 1970, Ser. No. 13,242
Int. Cl. C08d 1/00, 3/06, 7/04
U.S. Cl. 260—82.1    1 Claim

ABSTRACT OF THE DISCLOSURE

A continuous process for the preparation of alfin polymers is provided, wherein monomers are polymerized in the presence of an alfin catalyst, a low boiling diluent, and a molecular weight moderator. The low boiling diluent is preferably under reflux, for cooling of the reaction mixture during the exothermic polymerization, and it also makes possible the preparation of a flowable high solids content alfin polymer reaction mixture. Unreacted monomer, volatile low polymer, low boiling diluent and any additional solvents that may be present are separated by subjecting the alfin polymer reaction mixture to steam-stripping, and the condensate may be purified, and recycled for reuse.

---

This application is a continuation-in-part of Ser. No. 672,882, filed Oct. 4, 1967, and of Ser. No. 809,228, filed Mar. 31, 1969, both now abandoned.

This invention relates to a process for the continuous production of alfin polymers, and more particularly, to a continuous process for the alfin polymerization of monomers under reflux of a low boiling diluent, which can be an impurity present with the monomer, such as butanes and butenes which are present in some butadiene refinery or cracking fractions, recovering and recycling unreacted monomers, butanes, butenes and any other solvent that may be present.

Morton and coworkers in a series of papers in the Journal of the American Chemical Society, starting in 1947, describe an organoalkali metal catalyst for the polymerization of olefins and particularly dienes which they term an alfin catalyst, Journal of the American Chemical Society 69 161; 167; 950; 1675; 2224 (1947). The name "alfin" is taken from the use of an alcohol and an olefin in their preparation. The alcohol, a methyl n-alkyl carbinol, usually isopropanol, in the form of the sodium salt, the olefin, also in the form of the sodium salt, and an alkali metal halide, form a complex that constitutes the catalyst.

These catalysts are reported by Morton et al. to cause the polymerization of butadiene, isoprene and other dienes, alone and together with other copolymerizable organic compounds, in most cases olefinic in nature. The catalyst was discovered in the course of a study of the addition of organosodium compounds to dienes. Later on, Morton summarized the work done up until 1950 in Industrial and Engineering Chemistry, 42 1488–1496 (1950).

Exemplary of early interest in the use of alfin catalysts in U.S. Pat. No. 2,592,301, patented Apr. 8, 1952 to Robert G. Linville. Using a batch technique, Linville formed polymers of 1,4-dicyano-2-butene by subjecting the monomer to polymerization conditions in the presence of an alfin catalyst. The polymers were said to be useful as intermediates for the synthesis of polyamines for shrink-proofing wool carboxylic acids, etc.

U.S. Pat. No. 2,606,179 to Boyd, patented Aug. 5, 1952, describes the polymerization of ethylene, using an alfin catalyst in an aliphatic hydrocarbon solvent. The polyethylene produced was said to be distinguished by its clarity, hardness and stability, and had a molecular weight in excess of 20,000.

Foster in U.S. Pat. No. 2,841,574, patented July 1, 1958 claimed that vastly improved results in alfin-type polymerizations can be obtained by using as the solvent certain ethers, acetals, and amines. Foster suggested that the polymerization was effected by an entirely different reaction mechanism than theretofore obtained with alfin catalysts. Foster polymerized propenyl benzene, obtaining a polymer having a molecular weight of about 4500. Polybutadiene was also obtained, but the molecular weight was not given.

The elastomeric polymers obtained from dienes, alone or copolymerized with olefins, using alfin catalysts are termed alfin polymers or alfin rubbers. Because of the speed and ease of the reaction, these attracted considerable interest in the 1940's and early 1950's. However, the very speed of the reaction led to problems. The alfin rubbers have the disadvantage of having an extremely high molecular weight, generally in excess of 3,000,000, and frequently in excess of 10,000,000. As a result, although these polymers are generally gel-free and have high tensile strength, superior abrasion resistance, and tear strength, they are also very tough, and exhibit little breakdown and consequently poor banding on the mill. Therefore, they are difficult if not impossible to process using conventional equipment. Consequently, interest and research in the alfin rubbers until recently was minimal, and in their original form the alfin rubbers have found very little commercial application.

Diem, Pat. No. 2,856,391, patented Oct. 14, 1958, describes alfin type polymerizations obtained using a lithium alkoxide and an alkenyl lithium compound. The polymers were soft, and easily formed into smooth sheets on a rubber mill, in contrast to alfin polymers which required considerable mill breakdown and/or the addition of oils to produce a smooth sheet on the mill, according to Diem.

In all of the above patents, batch techniques were employed to produce the polymers. Batch techniques are however inefficient, and difficult to adapt to a commercial process. Pat. No. 2,606,179 suggests that the system employed could be easily adapted for continuous polymerization, because the polymer settles to the bottom of the reaction vessel and may be drawn off therefrom, but in fact no continuous system is described.

Pat. No. 3,197,448, patented July 27, 1965 to Gavlin, Hedman, and Hubbard, describes the production of elastomers by subjecting propylene and butadiene mixtures to the action of an alfin catalyst. A batch technique is used. There is no reference to a continuous process.

The difficulties in attempting to prepare alfin polymers by a continuous process are outlined in part by Kizer, Klopfer and Burke in U.S. Pat. No. 3,074,924, patented Jan. 22, 1963. Kizer et al. explain that alkali metal polymerizations of elastomers have generally been restricted to batch-wise or semi-continuous alternate batch-wise systems, because of the long periods required to initiate polymerization and carry it to the desired conversion. Kizer et al. noted that it had been proposed to carry out such polymerizations in continuous tubes, with the materials kept stirred up and advanced along the tubes by internal screw means, but such reactors have not been satisfactory, because of the tendency of the sticky polymer to build up on the walls of the reactor and on the screw, producing variable hold-up and consequently non-uniformity of the polymer, and ultimately complete clogging of the apparatus, requiring that it be taken out of service for clean-out.

Kizer et al. describe a system in which the nonaqueous liquid diluent for the reaction mixture is established in a longitudinally flowing elongated cylindrical stream, into which is introduced a polymerization catalyst, and then the monomer, conducting the polymerization in an extended region of the stream, which is maintained free of agitation and at substantially nonturbulent laminar flow, diverting the inner portions of the body of polymer progressively outwardly towards the periphery of the stream as the body flows longitudinally, and progressively discharging the longitudinally-moving thin annular body of polymer and diluent from the outer periphery of the cylindrical stream using a special valve. Thereafter, the solvent is removed.

It is not necessary, of course, to carry out a continuous polymerization using a single path system, such as described by Kizer et al., although if it were not for the difficulties of carrying out such a system using alfin polymers, it would definitely be a preferred one. Kizer et al. however, barely touch on the problems involved in converting the polymerization of alfin rubbers to a continuous operation. It is necessary to control not only the flow of the polymer through the system, but also its molecular weight. For this purpose, Kizer et al. add a "short-stopping agent" to arrest the polymerization at the desired stage. Greenberg adds a catalyst deactivator for the same purpose. However, this is a serious complication, since the solvent system must be freed from catalyst deactivator, or else it cannot be reused. The polymer that is recovered must be freed from monomer, low polymer such as dimer, solvent, and also catalyst residues. The catalyst (which is a solid) must be kept in a uniform suspension in the reaction mixture throughout the reaction, if polymerization is to be uniform and controllable. At the same time, yield must be optimized, and this is not easy to do while optimizing the other variables, such as solvent recovery.

Accordingly, it is not surprising that when alfin rubbers of relatively low and medium molecular weights, ranging from about 50,000 to about 1,250,000, were provided by Greenberg et al. via U.S. Pats. Nos. 3,067,187 and 3,223,691, all of the preparatory procedures described were batch procedures. There is a reference in the patent to a continuous process, and it is of course possible to visualize the process as a continuous operation, but in fact no details are given in these patents as to how a continuous process in which monomer and solvent are recovered and recycled could be carried out in practice.

The control of molecular weight made possible by incorporation of a molecular weight moderator, a dihydroaromatic compound, with the alfin catalyst during the polymerization, for the first time made possible the production of alfin rubbers that were capable of being processed easily, thus avoiding the alternative techniques previously suggested, such as that of Pfau et al. U.S. Pats. Nos. 2,964,083, granted Dec. 13, 1960, and 3,074,902, granted Jan. 22, 1963, who endeavored to reduce working viscosity of the alfin polymers by the incorporation of liquid plasticizers, particularly petroleum hydrocarbon oil. Accordingly, the Greenberg et al. patents have renewed commercial interest in the alfin rubbers, and a commercial development, of course, requires a process that would make it possible to prepare such rubbers as a continuous operation.

The alfin polymerization reaction is a highly exothermic reaction, and proceeds at a rapid rate, which increases as temperature increases, so that close control of the reaction is important, for uniformity of product, and is difficult to accomplish. In a continuous process, control is more difficult than in a batch process, because the continuously operated reactor must have enough built-in cooling capacity to deal with an aberration in the reaction or the reactants. The larger the volume of the reactor, the more complex the problem.

In accordance with the instant invention, a continuous alfin polymerization process is provided, in which control of the reaction temperature is facilitated by using a low boiling diluent in an amount of at least 30% by weight of the solvent, which aids in dissipating heat of reaction by way of a recirculating reflux system, and which also acts as a solvent. The process of the invention comprises continuously blending monomer, low boiling diluent, such as butanes and/or butenes, alfin catalyst, molecular weight moderator and any other solvent; polymerizing the monomer at a temperature at which the reaction proceeds while refluxing the low boiling diluent; continuously separating unreacted monomer, low boiling diluent, any other higher boiling solvent, any other volatile hydrocarbons, and alcohol from the alfin polymer reaction mixture by steam distilling such volatile materials, and thereafter recovering low boiling diluent, any other solvent, and optionally, the monomer, and recycling them for reuse, and washing and drying the alfin polymer.

A further problem in alfin polymerization reactions is the high viscosity of more concentrated solutions of the alfin polymer. The difficulty of flowing viscous solutions from stage to stage in a continuous process system and the difficulty of removing the exothermic heat of reaction make it necessary to restrict the solids content of the reaction mixture to a rather low proportion. In accordance with the invention, it has been determined that low boiling diluents can overcome the difficulty of dissipating the heat of reaction from concentrated alfin polymer solutions since the heat of reaction can be removed by reflux and condensation, as compared to conventional cooling coils. Moreover, the viscosity of the reaction mixture may be less, using a low boiling diluent as all or part of the solvent. Therefore, if low boiling diluents are employed in the polymerization reaction, alfin rubbers can be produced at higher solution concentrations, employing reduced amounts of the diluent, as compared to higher boiling solvents such as isooctane and hexane. The low boiling diluent can be more readily separated from the alfin rubber at the conclusion of the process, at a substantial saving in steam requirements, as compared to the higher boiling solvents.

The invention makes it possible to advantageously employ impure and less expensive monomers containing low boiling hydrocarbons as an impurity, and referred to in the trade as dilute monomer. Such low boiling hydrocarbons can serve as the low boiling diluent of this invention during the polymerization. Any low boiling diluent which by adjustment of reaction pressure boils at the desired reaction temperature can be used, provided it does not impair the effectiveness of the catalyst. In the case of butadiene, the diluting impurities are usually butanes and butenes, which are inert to alfin catalysts in alfin polymerizations. The proportion of such hydrocarbons in the monomer may be low, i.e., below about 30%, although in some cases it can range up to 35% or more. If it is less than 30%, however, the recirculating low boiling diluent quickly builds up the proportion to 30% or over.

Accordingly, in the present invention, dilute monomers, that is mixtures of monomers and any accompanying low boiling hydrocarbons, such as butanes and/or butenes, are subjected to alfin polymerization in the presence of a solvent composed of at least 30% of the low boiling hydrocarbons to produce alfin polymers in good yields. Heretofore, monomers for use in the continuous production of alfin polymers have been purified of all low boiling hydrocarbons in order to avoid destruction of the alfin catalyst by certain impurities. However, it has been found that dilute monomers, for example, by-product butadiene streams containing propane, propylene, butenes and/or butanes, and low boiling pentanes, produced in the cracking of higher hydrocarbons to produce ethylene, after having been treated to minimize catalyst interfering impurities such as water and acetylenes, when subjected to alfin polymerization in the process of the invention give high yields of alfin polymers, and, because they are readily available, at appreciably reduced expense, especially with regard to solvent and monomer costs, and steam requirements, as compared to that obtained in the alfin polymerization of pure monomer.

In the process of the invention, it is not necessary to purify the dilute monomer of any of the low boiling hydrorarbon components. If catalyst-reactive hydrocarbons such as acetylenes and cyclopentadienes are present in small amounts, catalyst losses are usually more than offset by the savings in eliminating the purification step and in the use of the low boiling diluents as all or part of the solvent. However, if present in large amounts the acetylenes, cyclopentadienes, and like interferants are preferably removed.

The low boiling diluent is employed in an amount of at least 30% by weight of the solvent. It can constitute all of the solvent, and preferably constitutes at least 90% up to about 99% of the solvent. The maximum amount used is usually determined by the pressure necessary to retain the low boiling diluent in the system, under reflux, at the reaction temperature. The minimum proportion is determined by the amount needed to observe a beneficial effect in reducing heat and economizing on heat requirements in solvent recovery and recirculation. At least 30% is needed for such beneficial effects, and at least 90% for optimum effects.

Thus, in the process of the invention the low boiling diluent can be employed as the main solvent, in admixture with from about 1 to about 10% by weight of higher boiling liquid aliphatic or cycloaliphatic saturated hydrocarbons, as the solvent mixture in the polymerization of the monomer. However, the dilute monomer can be continuously blended with alfin catalyst and molecular weight moderator, without additional solvent, if desired, since the concentration of monomer in the reactor feed can be controlled by recycling low boiling diluent that has been depleted in monomer, by virtue of its having been used in polymerization.

In the process of the invention, the molecular weight of the polymer is controlled by adjustment of the proportion of molecular weight moderator. No other modification of reaction conditions, proportions of catalyst, and other process variables is required. A catalyst deactivator and the resultant system contamination complicating recycling of unused materials such as monomer and solvent is thus unnecessary, eliminating a serious obstacle heretofore to realization of a continuous process.

A further feature of the continuous process of the invention is the attainment of any desired Mooney value in the alfin polymer within the range from about 30 to about 110. A separate catalyst deactivating agent is not required since the catalyst is destroyed in the process of separating solvent or diluent from the rubber. This enables good control of uniformity of the polymer, and is unlike a batch process. The reason for this is not known, but it permits processing of the alfin polymer without deactivation of the catalyst and without regard to possible alteration in the Mooney value of the polymer. This renders the process extremely attractive for commercial application.

In addition, considerable savings in steam consumption can be effected, due to the lesser heat requirements in removing a more volatile lower boiling solvent or diluent, as compared to a less volatile, higher boiling solvent or diluent. In addition, less catalyst is required, and the physical size of the polymerization equipment can be reduced, when high solids alfin polymer mixtures are produced.

The invention also provides for linking alfin catalyst preparation and the preparation of the sodium dispersion used in preparing the alfin catalyst with the continuous alfin polymer process system, using a high boiling solvent as the solvent in the catalyst and sodium dispersion preparations, blending this with low boiling diluent in the polymerization, separating the low and high boiling solvents, and recycling high boiling solvent to the catalyst and sodium dispersion preparations, and unreacted starting materials and low boiling diluent to the polymerization step. In this way, a fully self-contained system is provided, in which the only raw materials consumed are monomer, molecular weight moderator, and catalyst.

FIG. 1 represents a flow diagram showing the sequence of unit operations involved in a typical apparatus for carrying out the process of the invention.

These unit operations will now be considered in further detail.

ALFIN CATALYST PREPARATION

The linking of the high boiling solvents used in the preparation of the sodium slurry used for the alfin catalyst and of the alfin catalyst formation with the low boiling diluent used in the alfin polymerization reaction represents an important continuous process of the invention, and provides attractive savings in operation. If the same high boiling solvent is employed in the three steps, at the conclusion of the polymerization the high boiling solvent can be separated from the low boiling solvent by a solvent fractionation step. The recycle high boiling solvent after monomer removal, and removal of catalyst, alcohol, and olefin, and water, can simply be recycled from a common line for use in preparing sodium slurry and alfin catalyst, and the low boiling solvent and unreacted starting materials can be recycled to the polymerization step.

A particularly effective alfin catalyst is obtained when the sodium is employed as a finely-divided dispersion in the inert diluent, in which the maximum sodium particle size is about 1 to 10 microns, such as may be prepared on a Gaulin mill.

The amount of sodium in the dispersion is not critical, and can be adjusted to suit any alfin catalyst preparatory procedure that is desired. Usually, a sodium concentration within the range from about 2 to about 50% is satisfactory.

The high boiling solvent that is employed for dispersion of the sodium can be any liquid saturated or mono-unsaturated aliphatic or cycloaliphatic hydrocarbon. The hydrocarbon should be a liquid under the low to rather elevated temperatures during which the sodium dispersion and the alfin catalyst are formed. This requires that it remain liquid at temperatures as low as —20° C. and below, and at temperatures as high as 25 to 130° C. or higher, whichever is the maximum temperature reached during alfin catalyst formation.

The satisfactory aliphatic saturated and unsaturated hydrocarbon solvents that are also useful in alfin catalyst preparation and in alfin polymer formation, in conjunction with the low boiling diluent, have at least six carbon atoms, and include hexane, heptane, octane, nonane and decane, hexene-1, heptene-1, octene-1, nonene-1, 2,3-dimethylbutane; 2-methylpentane; 3-methylpentane, 2,2-dimethylpentane; 2,3-dimethylpentane; 2,4-dimethylpentane; 2,2,4-trimethylpentane; 2-methylhexane; 3-methylhexane; 2,4-dimethylhexane; 2,5-dimethylhexane; 2,2,4-trimethylhexane; 2,3,4-trimethylhexane; 3,3,4-trimethylhexane; 2-methylheptane; 3-methylheptane; 2,3-dimethyloctane; 2-methylnonane; 3,4-dimethylnonane; 3-methyldecane; 2-methylundecane; 2-methyldodecane; 2,2,4-trimethyldodecane; etc., and mixtures thereof. However, they can include small proportions of lower boiling hydrocarbons, having five carbon atoms or less, such as pentanes and butanes. These will serve as low boiling diluents in the polymerization.

Also useful are cycloaliphatic hydrocarbons having five or more carbon atoms, such as cyclohexane, cyclopentane, methyl cyclohexane, and cycloheptane.

The mono-, di-, and tri-methyl substituted aliphatic hydrocarbons are exemplified, but it should be appreciated that other lower alkyl-substituted hydrocarbons are considered applicable. Other suitable alkyl radicals include ethyl, isopropyl, butyl, etc. Especially suitable, since they are readily obtainable, are odorless mineral spirits, boiling range 349–406° F., commercial mixtures of branched aliphatic hydrocarbons, such as:

"Isopar E," a material devoid of normal hydrocarbons, which typically has the composition:

| Component: | Weight percent |
|---|---|
| 2,2,4-trimethylpentane | 2.2 |
| 2,5-dimethylhexane, 2,4-dimethylhexane | 4.8 |
| 2,3,4-trimethylpentane | 11.5 |
| 2,3,3-trimethylpentane | 21.1 |
| 3-methylheptane | 33.0 |
| 2,2,4-tridimethylhexane | 6.2 |
| 3-methyl - 4-ethylhexane, 3,4-dimethylheptane 2,3 - dimethylheptane, 3,3,4-trimethylhexane | 5.7 |
| 15 other iso-components | 13.7 |
| $C_9$ naphtha+$C_{10+}$ | 1.8 |
| | 100.0 |

The $C_6$ hydrocarbon mixture having the following composition:

| Component | Percent Weight | Range |
|---|---|---|
| 2-methylpentane | 16.2 | 8–33 |
| 3-methylpentane | 15.3 | 14–19 |
| n-Hexane | 49.1 | 38–61 |
| Methylcyclopentane | 17.1 | 5–18 |
| Cyclohexane | 1.4 | 0.2–2 |
| Benzene | 0.1 | <1 |
| Unknown (including propane, butanes, pentanes and toluene) | 0.2 | <1 |
| Total | 100.0 | 100.0 | and light alkylates which are devoid of n-hydrocarbons, such as Sinclair's "Light Alkylate," which has the following composition:

| Component: | Weight percent |
|---|---|
| 2-methylbutane | 10.0 |
| 2,3-dimethylbutane | 8.2 |
| 2,4-dimethylpentane | 5.8 |
| 2,3-dimethylpentane | 7.9 |
| 2,2,4-trimethylpentane | 21.5 |
| 18 other $C_8$ and $C_9$ branched aliphatic hydrocarbons | 46.0 |
| | 100.0 |

The small pentane content is not deleterious in the catalyst and sodium dispersion preparation, and helpful in the polymerization, but of course insufficient for that stage. However, the low boiling hydrocarbons, such as butanes and butenes, are not as attractive a solvent in the preparation of the sodium dispersion and/or alfin catalyst, because of the their high vapor pressures at ambient and elevated temperatures.

The sodium dispersion in an inert diluent can be employed in the usual way in any desired preparation of alfin catalyst. Typical preparations of an alfin catalyst have been described in sufficient detail in the Greenberg et al. Pats. Nos. 3,067,187 and 3,223,691 and in Hoffman et al. No. 3,317,437, and in the Morton articles supra, so that full details are not required here, and those skilled in the art will know from the following description how to utilize sodium dispersions in accordance with the invention in such preparations.

As the secondary alcohol component, to form the sodium alkoxide, any methyl n-alkyl carbinol having from one to about ten carbon atoms can be used, such as isopropanol, methyl-n-propyl carbinol, and methyl-n-butyl carbinol. Isopropanol is preferred.

The alkoxide has been prepared in the temperature range of −20° C. to 84° C., in the caurse of catalyst preparation. The reaction temperature used is that suitable for metallation of the olefin, by any preferred method.

The olefin has from about three to about ten carbon atoms, and should contain the group —CH=CHCH₂—. Propylene is preferred, giving allyl sodium, but butene-1, butene-2, pentene-1 and hexene-1 can also be used. Terminal olefins. $CH_2$=CH—$CH_2$— are preferred. Activity may decrease as the olefin molecular weight increases.

The alkenyl sodium, sodium halide, and sodium alkoxide composing the alfin catalyst are prepared by reaction of the sodium slurry with the alcohol and the olefin in the presence of the dispersing liquid used for the catalyst. This can be and preferably is the same as the inert diluent used for the sodium dispersion. Inert aliphatic or cycloaliphatic hydrocarbons are satisfactory.

The olefin is metallated by use of an alkyl sodium which is prepared in situ from an alkyl halide having from about three to about ten carbon atoms. Butyl chloride is preferred, but amyl chloride, hexyl chloride, hexyl bromide, heptyl chloride, amyl bromide, and octyl chloride can also be used.

The reaction proceeds at low temperatures, which is advantageous when the olefin is a gas, such as propylene. A temperature from about −20° to about 130° C. can be employed. From one-half to about five hours' reaction time is normally adequate.

The reaction mixture can be prepared by mixing the catalyst diluent and sodium dispersion, and then adding the alcohol. After the alkoxide has been formed, the alkyl halide is added and a sodium alkyl formed. Olefin is then added and the olefin is metallated and an alkane formed. The resultant mixture may then be used as the catalyst.

It is also possible to add the alcohol to the sodium dispersion mixed with the catalyst diluent, forming the sodium alkoxide, and then adding the alkyl halide, and, finally, the olefin. This procedure requires half the amount of alkyl halide, and three-quarters the amount of sodium, required by the first procedure, and is therefore preferred in a commercial operation.

THE MOLECULAR WEIGHT MODERATOR

The moderator employed for molecular weight control is a dihydro derivative of an aromatic hydrocarbon, as described in the Greenberg et al. Pat. No. 3,067,187.

The dihydro derivatives of aromatic hydrocarbons as embodied herein include 1,4-dihydrobenzene, 1,4-dihydronaphthalene, 1,2-dihydrobenzene, 1,4-dihydrotoluene, p-1,4-dihydroxylene, allyl benzene, 1-allyl-naphthalene, 1,2-dimethoxy-4-allyl benzene, 1 - methoxy-1,4-dihydrobenzene, 1 - phenyl-1,4-dihydrobenzene, 1-ethyl-1,4-dihydrobenzene, and 1 - ethoxy-1,4-dihydrobenzene; 4-allyl-toluene, 4-allyl anisole, 4-allyl-diphenyl, 1,4-diallyl benzene, chlorobenzene, bromobenzene, iodobenzene, 1-bromonaphthalene, 2-bromonaphthalene, and the like, and mixtures of these. 1,4-dihydrobenzene and 1,4-dihydronaphthalene are preferred.

The amount of moderator controls the molecular weight, and the amount required is dependent upon such factors as the temperature and pressure of the reaction and the quantity and type of diluents employed. In general, it may vary from about 0.1 to about 10%, based on the weight of the monomer, and in the case of the preferred moderators the use of about 0.4 to about 1 percent is preferred.

In the practice of the invention, the process conditions, i.e., temperature, time, catalyst and catalyst concentration, are fixed, and the molecular weight is controlled simply by adjustment of the proportion of molecular weight moderator. Thus, complete molecular weight control is obtained by change in only one variable, and that an easily controlled one. The result is a process that is closely controllable within surprisingly narrow tolerance limits.

Although the mechanism of the action of these moderators in molecular weight control is not yet fully understood, carbon–14 studies have shown that at least one molecule of the moderator is present for each polymer chain, the additional aromatic ring being present presumably as a terminal group. These moderators do not change the ratio of 1,4-trans to 1,2-isomers in the resultant polymers, the ratio in the range of 2 to 3 in normal alfin rubbers being retained.

THE LOW BOILING DILUENT

The low boiling diluent is a liquid that is condensible at the reaction pressure at some convenient temperature below the reaction temperature, has a boiling point at or below the boiling point of the reaction mixture at the reaction temperature and pressure, and is inert to alfin catalysts. Inasmuch as the polymerization temperature is as low as 40° F., the diluent is quite low boiling, and boils at atmospheric pressure at below 85° F. but above −44° F. and preferably above 20° F.

Any saturated or mono-unsaturated hydrocarbon having from three to five carbon atoms can be used, but butane, isobutane, and the butenes, i.e., butene-1, butene-2, and isobutylene are preferred. Propane and propylene can be used, but require higher pressures to maintain in the liquid phase, under the reaction conditions. The branched chain pentanes and pentenes can also be used, such as isopentane, neopentane, 2-methyl-1-butene and 2-methyl-2-butene.

THE ALFIN MONOMER

The process of the invention can be employed in the alfin polymerization of a wide variety of unsaturated organic compounds, including aliphatic dienes such as 1,3-butadiene, 2,3-dimethyl-1,3-butadiene, isoprene, piperylene, 3-methoxy-1,3-butadiene, aryl olefins, such as styrene, the various alkyl styrenes, p-methoxy-styrene, alpha-methyl-styrene, vinyl naphthalene, and other unsaturated hydrocarbons. 1,3-butadiene alone and combinations of butadiene and styrene and of butadiene and isoprene are preferred polymerizable unsaturated compounds.

Especially useful are dilute monomers, the monomers available commercially in admixture with processing impurities such as butadienes available as a cracking fraction in admixture with butenes and butanes such as butene-1, iso-butene, transbutene-2, cis-butene-2, n-butane and iso-butane. Such dilute monomers should be relatively free from acetylenes, and other alfin-catalysts-reacting or polymerizable compounds, such as carbonyl compounds, sulfur compounds, and oxygen and nitrogen compounds.

The monomer concentration in the dilute monomer is in no way critical. Enough is used to provide sufficient monomer to ensure obtention of the desired rubber concentration in the rubber cement. Adjustment of monomer concentration can be obtained by recycle of diluent, if the monomer concentration is too high. The low boiling diluent that is present is preferably refluxed, and all of the hydrocarbon diluent serves as a solvent. Thus, for example, in the case of butenes and/or butanes as the low boiling diluent employed in the alfin polymerization of butadiene, or a combination of butadiene and another monomer, the dilute monomer can contain from about 4 to about 99% by weight butadiene and preferably from about 7 to about 25% by weight butadiene, and the remainder diluents.

An example of a typical butadiene-butene-butane mixture is that obtained from the cracking of ethane to produce ethylene. In addition, a similar mixture is available as a by-product in the catalytic dehydrogenation of butanes or butenes to produce butadiene. The product stream in these cases is preferably treated in a conventional manner to remove acetylenes and cyclopentadienes therefrom.

THE ALFIN POLYMERIZATION REACTION

Before employing a dilute monomer, it is essential that it be prepared for the alfin polymerization by removing any water, acetylenes (if present in substantial quantities), any water, and any polymerization inhibitor, particularly any phenols, such as tertiary butyl catechol, since these materials may destroy the alfin catalyst. The water is removed from the monomers, such as in distillation dryer. If the drying tower is operated at 75 p.s.i.g., cooling water may be used for condensation of both the monomers and the water. The water can then be separated from the hydrocarbon monomer layer, which is recycled to the column. The almost dry monomers can be withdrawn from the dryer as a vapor, and condensed again. The monomers are now essentially dry and contain 20 p.p.m. of water or less, together with a few p.p.m. of the inhibitor, tertiary butyl catechol, for example. The monomer can then be withdrawn as a vapor, leaving behind the inhibitor, which is essentially non-volatile relative to the monomer, and is ready for feeding to the polymerization reactor system. The acetylenes and cyclopentadienes have been previously removed by methods such as selective solvent extraction, chemical treatment, selective hydrogenation, etc.

The polymerization is effected in the presence of a solvent composed of at least 30% low boiling hydrocarbon diluent having from three to five carbon atoms. The preferred low boiling diluents are butanes and/or butenes. The solvent can also include from 1 to 10% of a high boiling inert aliphatic hydrocarbon having six or more carbon atoms, such as octane, or hexane, and heptane, or cycloaliphatic hydrocarbon having five or more carbon atoms, such as cyclohexane, cyclopentane, cycloheptane or Decalin. As indicated above, the high boiling solvent can be the same hydrocarbon employed for the dispersion of sodium in the preparation of the alfin catalysts, such as odorless mineral spirits or Isopar E, or commercial hexane or iso-octane. Branched chain hydrocarbon solvents tend to give polymers having a lower solution viscosity than straight chain hydrocarbons.

The amount of alfin catalyst (solids basis) that is employed is normally from about 1 to about weight percent, and preferably from about 1 to about 3.5 weight percent based on the weight of the unsaturated monomers.

As indicated previously, it is quite important that water be excluded from the alfin polymerization reaction mixture, and consequently it is essential that all components that are employed therein be anhydrous.

The moderator is used in an amount to give the desired molecular weight. It has been determined that after the desired molecular weight is reached in the continuous process of the invention, it is quite unnecessary to arrest the polymerization. The moderator gives sufficient protection. In fact, to add compounds such as ethanol for the purpose is undesirable, because this will contaminate the solvent system, and since it can poison the alfin catalyst, it must be removed before the solvent can be recycled.

The reaction is carried out at an elevated temperature, in contrast to the batch-wise type of reaction described in the Greenberg et al. patent, which employs room temperature or below. Whereas in the Greenberg et al. process the reactants are mixed at a very low temperature, of the order of −10° C., all of the streams of reactants, including catalyst, molecular weight moderator and diluent-solvent, are blended in the continuous operation of the invention at a temperature within the range from about 40 to about 160° F., so as to expedite a rapid attainment of the reaction temperature, in order to facilitate heat removal during the initial stages of the reaction.

The polymerization reaction is carried out in a reaction zone, with the blend of reactants continuously entering at one end, and alfin polymer reaction mixture continuously being withdrawn at another end. The rate of transit through the zone is timed to allow polymerization to proceed at least to 70% of completion at the moderator level employed. This usually requires from about two to about five hours. The polymerization temperature is −10 F. or above, up to approximately 200 F., and preferably within the range from about 40 F. to about 160° F.

The reaction is exothermic, and after the selected reaction temperature is reached, and reaction is proceeding, the reaction temperature should be controlled by removal of heat liberated in the course of the polymerization, preferably by reflux of the low boiling diluent. In this event, the diluent in vapor form is circulated through a condenser, condensed by means of a coolant, such as cold water, and then recirculated back to the reactor. In addition, the reactor can be provided with another coolant system, such as jackets and cooling coils, through which a coolant can be circulated, such as water, but this is normally unnecessary, unless reflux is not used.

For most effective control of reaction temperature and hence of the polymerization, a series of reactors can be used. The reactors are operated liquid full or partially liquid full, and the coolant system is selected accordingly. If the system employs a reflux condenser, the reactors are operated with a vapor space. If the reactors are operated liquid full, an efficient coolant system associated with the reactor to provide effective cooling without reflux is necessary. The pressure is selected as required by refluxing diluent, and the reaction is carried out in the liquid phase, in solution or dispersion in the diluent or solvent employed. Pressures of from about 1 to about 25 atmospheres are suitable.

The low boiling diluent offers considerable versatility in the alfin rubber content of the reaction mixture. It is possible to use a relatively dilute solution and intermediate concentrations up to a rather concentrated solution of the reactants. The ease of heat removal by reflux of the low boiling diluent, even of concentrated solutions, makes this possible. In the continuous operation of the process of the invention, therefore, the effluent from the polymerization reaction system can contain as much as 25 weight percent of alfin rubber, and can still be handled. Usually, the alfin rubber content is from about 8 to about 15 weight percent alfin rubber at the reaction temperature, before solvent removal. As little as 5% alfin rubber is satisfactory and even 2% can be handled, but of course as the solution becomes more dilute the volumes of solvent being cycled become rather large for the weight of polymer being produced, and efficiency goes down. The olefin and/or diene monomer starting material concentration in the reaction is adjusted accordingly, and is also at most 25 weight percent, and preferably from about 10 to about 15 weight percent. If monomer concentration is above 30%, adjustments can be made by not diluting monomer but by recycling low boiling diluent.

The polymerization reaction is normally carried out under such conditions that approximately 80 to 85% of the diene and/or olefin monomers entering is polymerized. The degree of polymerization is a matter of economics. It is not always desirable to obtain a maximum polymerization of the olefin and/or diene starting material, unlike a batch-wise operation. Control of molecular weight and hence of Mooney of the polymer is effected by the amount of the molecular weight moderator that is added. The polymerization product is obtained as a solution in the solvent of the alfin rubber, and this solution of the alfin rubber is referred to as alfin rubber cement.

At the conclusion of the polymerization reaction, an antioxidant can be added, as a preservative for the alfin rubber during subsequent processing. A very small amount of the antioxidant will be effective. An amount within the range from about 0.1 to about 5% by weight of the alfin polymer will suffice. As the antioxidant, there can be employed any organic phenol, organic amine, or aminophenol, such as, for example, 2,2'-methylene-bis(4-methyl-6-tertiary-butyl-phenol) or N-phenyl-2-naphthylamine.

REMOVAL OF VOLATILES INCLUDING MONOMER AND SOLVENT AND FORMATION OF ALFIN POLYMER CRUMB

In this step, the alfin polymer is recovered as wet crumb from the reaction mixture, and any volatile materials are ordinarily removed by steam stripping. A portion of the solvent and monomers can be removed by a preliminary dry flashing operation, if desired; this is a matter of economics. The stripping operation is carried out continuously in the presence of hot water, to hydrolyze any sodium acetylide and sodium cyclopentadiene that may be present, permitting removal (as volatiles) of acetylenes and cyclopentadiene. Volatile low polymer can also be stripped. The alfin catalyst is hydrolyzed, and any olefin and alcohol released therefrom are removed as well, at this stage.

As the first stage in the the steam stripping, the alfin polymer solvent solution withdrawn at the end of the polymerization zone can be blended with hot water. The water is held at a stripping temperature at which monomer, low boiling diluent, catalyst alcohol, and catalyst olefin are volatilized (inasmuch as the alfin polymer reaction solution is continuously being blended therewith in a crumb former or solvent stripper) by injection of steam. Thus, a true steam distillation of the volatiles is obtained, in combination with a very rapid flashing of volatiles, due to the heat of the water when the water and reaction solution are blended. The alfin polymer precipitates from the polymer solution as a wet finely divided crumb, and becomes suspended in the water in this form.

The amount of water used is enough to form an alfin polymer crumb suspension containing from about 2 to about 10 weight percent crumb. The maximum crumb content is determined by the handling properties of the suspension.

The alfin polymer reaction solution is blended with the hot water continuously, and the volatiles are continuously drawn off overhead while the alfin rubber crumb that becomes suspended in the water is continuously separated by screening or centrifuging. The solution can be blended with the water at one end of this zone, and the crumb removed at another end. One or several stages can be used, depending on equipment limitations. Conventional crumb formers or solvent strippers as used in the synthetic rubber industry are suitable. To aid in stabilizing the suspension, surface active agent can added.

The suspension of cement in water simultaneously is subjected to steam stripping. Steam distillation is effected at a temperature within the range from about 50 to about 120° C., as a result of which the suspension can be brought to the boiling point of water. Any volatiles that are not flashed off are steam distilled out.

The steam stripping step is normally carried out under atmospheric pressure. However, it may be desirable to employ sub or super atmospheric pressures, in order to achieve lower or higher stripping temperatures, and good crumb formation. In addition, it may be desirable from an economic viewpoint to operate the first crumb-forming stage at a sufficient pressure such that most of the low boiling diluent is vaporized and condensed directly in a condenser with a coolant such as water, although other coolants can be used. Then the slurry product from this stage consisting of hot water and rubber crumb containing a small portion of the low boiling diluent, higher boiling solvent, salts, alcohol, and any crumb-forming additives, is chraged to a second crumb forming stage, operated at a pressure (such as atmosphere pressure) such that by injection of steam, a steam distillation as in ordinary crumb former operation, is effected and most of the remaining volatiles (such as the diluent and higher boiling solvent) are vaporized, and an aqueous slurry consisting of essentially water, rubber crumb, salts, alcohol, and crumb-forming aids is discharged for recovery of the rubber.

The time required to remove all volatiles depends to some extent on the amount and type of volatiles and the physical characteristics of the alfin polymer being processed. Usually, from about 2 to about 90 minutes are adequate. For example, an alfin copolymer of butadiene and styrene, containing from about 75 to about 98 weight percent of butadiene, can be recovered from solution in a butane-butene diluent wherein the polymer concentration is about 10%, as an essentially diluent-free rubber crumb, that is, containing less than about 0.5% diluent, by steam stripping at a temperature of from about 200 to about 210° F. for about 3 minutes to a half-hour.

If desired, as an alternative procedure, the alfin polymer reaction solution can first be subjected to a continuous water-washing treatment, preferably passing the reaction solution and the wash water countercurrently to each other, thereby removing isopropanol and water-soluble salts, and facilitating the production of a polymer having an extremely low ash content. The washing step is not necessary, in most cases, however.

In a variation of the washing step, in order to ensure a substantially complete removal of water-soluble impurities from the polymer-solvent solution; a two stage or plural stage countercurrent washing can be used.

The volatiles overhead, including monomer, low boiling diluent, high boiling solvent, alcohol, olefin, moderator and water, may be drawn off together, or if a multiplicity of crumb formers operating at different pressures are used, the vapor streams therefrom may be treated separately. Any high boiling solvent is separated from the other constituents by the usual condensation and fractionation techniques, and recycled. The monomer and low boiling diluent can be recovered by the usual condensation and fractionation techniques and recycled together, if desired. All are dried before recycling.

The above description generally applies to butadiene-styrene and butadiene-isoprene rubber synthesis. Where butadiene-styrene rubber is produced, the butadiene-butane-butene-styrene mixture may contain relatively little catalyst consuming substances such as acetylenes, and the acetylene content in the system does not build up to significantly costly levels so that it may not be essential that the acetylenes be removed from the recycle streams. However, where butadiene-isoprene rubber is produced, the quantity of cyclopentadiene and acetylenes that may be introduced with the isoprene could be substantial. It is possible to purge part of the acetylenes by having them present in admixture with diluent that entered the process with the dilute monomer since this diluent must also be purged. Depending upon the economics of the operation, it may be desirable to practice high levels of monomer conversion thus avoiding the necessity for recovering the monomers and hence the net acetylenes and cyclopentadiene can be rejected with the purged diluent. The amount of low boiling diluent that must be purged is equal to that which is generated in the process, plus that entering with any raw material, such as the monomers.

If recovery of the unreacted monomers is desired, the butadiene can be partially recycled with the acetylenes and inert diluent purged, thus avoiding an excess build-up of acetylenes. The cyclopentadiene can be similarly treated by recycling a portion of it with the isoprene and purging the remainder of the unreacted isoprene from the process.

It is also possible by a preliminary dry flash to recover a substantial portion of any unreacted monomers free of acetylenes and cyclopentadiene and recycling these to the process, then by practicing steam stripping on the remainder of the cement and recovering the remainder of the monomers now contaminated with acetylenes and cyclopentadiene to recycle a portion of these monomers and acetylenes and cyclopentadiene after appropriate treating to remove alcohol and water, and to reject the rest.

CRUMB SEPARATION AND FINISHING

The purpose of this treatment is to dry the alfin rubber crumb, which at this stage may still contain small amounts of any high boiling solvent, molecular weight modifier, and any relatively nonvolatile monomer, such as styrene.

The rubber crumb is first separated by running the suspension through a screen. The use of cold water as a wash for the crumb cake will cool the crumb, and prevent its sticking to the screen. The water wash may also leach out any residual water-soluble salts present in the crumb. The alfin polymer crumb from the screen may then be brought to an expeller, which by means of screw compression reduces the water content to approximately 10%. The remaining water and any diluent or solvent can be removed by flashing, compressing the rubber in an expander, so as to heat it, and then releasing the pressure suddenly so that water as steam and diluent or solvent flash off. The final product from the expander can baled, and is ready for distribution and/or use.

THE CONTINUOUS SYSTEM OF FIGURE 1

FIG. 1 shows a system in which the continuous process for preparing alfin rubbers in accordance with the invention is carried out in the production of alfin rubbers from butadiene, isoprene and styrene, separately or in any combination.

The synthesis of the alfin catalyst in this system takes place in Zone A. The process shown employs sodium, which is prepared as a dispersion in a liquid diluent at a 25 to 50 weight percent sodium concentration. The molten sodium is fed via pump 1 to the storage tank 2 where it is stored under nitrogen. Diluent enters via line 3 and sodium (molten) via line 4 into the mixing tank 5, whence it is circulated via line 7 to a Gaulin mill 8 to reduce the particle size of the sodium, and then back via line 9 to the mixing tank, to provide an intimate dispersion of sodium of a particle size of less than 10 microns average diameter in the diluent. The finished dispersion is bled off continuously via line 10 to one of two storage tanks 11, 12, equipped with agitators to maintain uniformity.

To prepare the alfin catalyst, a batch technique is used. Diluent from storage 14 is charged via line 15 to the catalyst synthesis reactor 16, an agitated vessel equipped with cooling facilities. Sodium dispersion is added via line 15 from tanks 11 or 12, and isopropyl alcohol is gradually added from storage 17, via line 18 with agitation and cooling at a temperature of approximately 0 to 80° C. Since the reaction is exothermic, the alcohol addition is slow. In this way, one-third of the sodium is converted to sodium isopropoxide. The addition of butyl chloride from storage 19 via line 18 then converts most of the remaining sodium in the tank 16 to equimolar quantities of sodium butyl and sodium chloride. This also is an exothermic reaction and cooling is required. The temperature is held within the range from about 0 to about 80° C.

After the addition of butyl chloride is complete, the reaction is allowed to proceed to completion, with agitation. Propylene from storage 20 is then added directly via line 18 to the liquid contents of the vessel. This addition converts sodium butyl to sodium allyl, with the formation of butane as a by-product. Very little heat is evolved at this point, and the reactor is kept under the pressure of the propylene solution. The pressure at this point should be less than 15 p.s.i.g. The contents of the reactor are held at this temperature for several hours, and the pressure then reduced to atmospheric by venting. The contents then are transferred to one of two catalyst storage tanks 21, 22. Each storage tank holds approximately a one day supply of catalyst for use in the continuous process of the invention.

The catalyst preparation can be converted to a continuous operation by providing three catalyst reactors in series, in which each step of the catalyst preparation is carried out in sequence.

Catalyst suspension is supplied to the polymerizers continuously from one of tanks 21, 22 via line 23. The tanks are equipped with agitators to avoid settling of the solids.

The alfin monomer polymerization process takes place in Zone B. The process will be described for preparing a butadiene-styrene rubber. Dilute butadiene monomer feed containing butane and butenes and having been treated so that it has a suitably low acetylenes content is prepared for use in the polymerization by removing water, and any inhibitor in the stripper 24, since these substances destroy catalyst. Styrene monomer from line 25 containing a low inhibitor concentration of the order of 10 p.p.m. is mixed with the streams in line 72 and then flows to the process after passing through dryer 71. Styrene monomer is stored in tank 26. The preparation of a butadiene-isoprene rubber is similar, except that the butadiene and the isoprene are mixed. The dry monomers including the butanes and/or butenes are fed via line 33 to the first polymerization reactor 31. Dry moderator is stored in tank 27.

The polymerization is carried out by passing recycle stream 30 consisting essentially of some isooctane, employed in the preparation of the alfin catalyst, recycled diluent (butanes and butenes) and butadiene and styrene to the first of the two polymerizer reactors 31, 31'. Dry moderator from tank 27 and fresh dry dilute monomer in line 33 are mixed with the recycle stream in the desired proportions, and charged together to the polymerizer 31. Catalyst is injected separately via line 23.

Since the reaction is exothermic, heat must be removed. For this purpose, reflux lines 32, 32' are connected to each reactor 31, 31', wherein the low boiling diluent vapors from the reactors are cooled by means of condensers 34, 34', using water or other suitable liquid, and returned as condensate via lines 35, 35' to the reactors. The reaction temperature is held within the range from about 100 to 200° F. All polymerizers are operated with a vapor space.

The polymerization pressure is such that the desired reactor temperature is obtained, and the vapors condensed in the reflux condenser with the coolant used; cooling water is shown in FIG. 1.

The polymerizer effluent from the last reactor 31' flows via line 37 to the concentrator feed tank 38, whence it is fed via line 40 to the first of two solvent strippers or crumb formers 41, 41'. Approximately 95% of the total diluent is removed in the first solvent stripper, and substantially all of the residual unreacted monomers and low boiling diluent are recovered. This stripper operates at a pressure greater than atmospheric. The vapor stream from solvent stripper 41 flows to condenser fractionator 70 via line 42. Here the unreacted monomers and low boiling diluent are separated, and a portion purged and a portion recycled to the polymerizer via line 72. The purge stream will contain an amount of butanes and butenes, such that their concentration in the polymerizers is controlled. Associated with this stream will be some unreacted butadiene and isoprene and the net amount of acetylene and cyclopentadiene that entered with the monomers.

The vapor stream from the second crumb former 41' flows via line 42' to condenser 57', thence to water hydrocarbon separator 68. The water containing some alcohol is purged. The hydrocarbon layer consisting of essentially high boiling solvent and styrene along with some alcohol, water, and heavy ends, are sent via line 78 to the fractionating system 43. Here the various components are separated and purified. Purge streams consisting of alcohol and heavy ends are taken. A stream of high boiling solvent is recycled to 14. A stream comprising recovered styrene, line 46, is sent to dryer 71 and from there recycled to the polymerizers.

The crumb formation and finishing operations take place in Zone C. These are the same whether an isoprene or styrene rubber is made. The isoprene rubber case is described.

Rubber cement for example containing approximately 10 to 12 weight percent rubber is continuously charged to the first of two solvent strippers 41, 41'. It is mixed with hot recycled water entering via line 47 so that a suspension of alfin cement in water results. If desired, a dilute solution of emulsifying agent from storage 44 can be added via line 45. Antioxidant from storage 37 can also be added to line 40. The resulting mixture enters the solvent stripper 41, a vessel equipped with a stirrer and overhead collection line 42 running to condenser fractionator 70 and which is operated at a pressure of 70 p.s.i.g. in this particular example, but pressures of from 0 to 300 p.s.i.g. can prevail, depending upon the composition of the feed. The water is hot enough to flash the diluent. Steam is injected via line 49 to effect a steam distillation, and heat the mixture to a temperature of about 160 to 180° F., while the mixture is stirred.

Diluent vapors escape via line 42. A slurry of alfin rubber crumb results, and the rubber slurry is removed from below and is sent to the second stage solvent stripper 41', which is similar to the first stage. Most of the solvent is removed in the first stage, and the rubber entering the second stage has for example a solvent content of the order of 1 to 5 weight percent, based on the alfin rubber content. The solvent there referred to is a mixture of $C_4$ hydrocarbons and the high boiling solvent used in catalyst synthesis.

Stripper 41' operates at a temperature of approximately 215° F. and at a pressure ranging from about 0.5 to about 2 p.s.i.g. Steam is also injected directly into this vessel via line 49. An aqueous slurry of alfin rubber of the order of 2 to 6 weight percent rubber is withdrawn via line 50. The diluent or solvent content of the rubber at this point is of the order of 1 weight percent, based on the alfin rubber.

The product vapor stream in line 42 contains essentially all of the hydrocarbons that were present with the exception of the rubber, including butenes, butanes, isooctane (solvent), moderator and monomers. In addition, it contains propylene, formed by decomposition of the catalyst with water to form sodium hydroxide. It also contains ispropyl alcohol, formed by hydrolysis of the sodium isopropoxide.

The overhead in line 42' from crumb former 41' is condensed in condenser 57 and flowed to a combination decanter and gas liquid disengager 68. Liquid hydrocarbon stream in line 78 containing isooctane, butenes, butanes, monomer and moderator is sent via line 42 to the heavy ends removal fractionators 43 wherein high boiling solvent, alcohol and heavy ends can be separated and the high boiling solvent recovered.

The rubber crumb in line 50 contains small quantities of the moderator dihydronaphthalene, styrene (if present), as well as a small amount of solvent and of diluent. The quantity of diluent and solvent in the crumb at this stage should be kept to a minimum by appropriate adjustment of the steam stripping conditions.

The slurry from line 50 enters a separator 51 equipped with a mechanical rake 52, so that rubber crumb which floats to the surface of this vessel can be skimmed off. The water in the lower portion of this vessel, relatively free of rubber crumb, is recycled to stripper 41 via lines 53, 54, 47. In addition, to prevent buildup of salts, a proportion is purged, and replaced by make-up water which enters at line 54.

The rubber crumb which is present in the form of small particles and contains approximately 60 weight percent water and which is raked out enters a dewatering screen separator 55 via chute 56. In the chute, the rubber crumb is contacted with a stream of cold water which cools the crumb and prevents clogging of the dewatering screen. The addition of water at this point also reduces the salt content of the rubber crumb. The underflow from the screen consists essentially of water containing a small amount of rubber fines, and is withdrawn and pumped to a secondary fines settler 58. Rubber crumb is allowed to overflow from the upper portion of this vessel, and passes via line 59 back onto the screen separator 55. The underflow consists of water containing dissolved salts, and is purged.

The alfin rubber crumb discharged from the separator 55 is fed by conveyor 60 to an expeller 61. The expeller by means of screw compression reduces the water content from approximately 60% to approximately 9 weight percent. The water discharged from the expeller is returned to the fines settler 58, via line 62. The rubber from the expeller passes through line 63 and enters an expander 64. Here, by compression, and jacket heating, the rubber is heated, so that upon discharge water as steam and solvent flash off. A stream of hot purge air to carry away water vapors and any solvent to prevent condensation in the crumb is provided by blowers 65. The alfin rubber at this point in the form of crumb is conveyed to a crumb conveyor and cooler 66 and subsequently to a baler 67 where it can be packaged in 75 pound bales. These are conveyed via conveyor 69 to storage. The solvent and other volatiles removed at the expander are vented.

The fractionation system designated by 43 is designed to (1) recover a relatively pure stream of high boiling solvent, (2) provide a purge stream containing isopropyl alcohol, (3) provide a purge stream containing heavy ends, and (4) recover a portion of the styrene as a dilute stream. The fractionation system designated by 70 is designed to (1) Recover the monomers, butadiene and isoprene (if present), along with the butanes and butenes. This stream will also contain traces of acetylenes and cyclopentadiene. A portion of this stream is purged;

(2) Provide a stream consisting of high boiling solvent, alcohol, and heavy ends. This stream is processed further in fractionation system 43.

The equipment described can be designed to produce 20,000 long tons per year of alfin rubber on a 100% gum basis. This can be polybutadiene, a butadiene-isoprene copolymer, or a butadiene styrene copolymer. The butadiene-isoprene copolymer can be approximately 80 butadiene and 20 weight percent isoprene. The styrene rubber can be approximately 85% butadiene, and 15 weight percent styrene. The rubber has a 30 to 110 Mooney range.

The following examples in the opinion of the inventors represent preferred embodiments of their invention.

EXAMPLE 1

A butadiene-styrene copolymer is prepared in accordance with the following procedure.

Liquid sodium (400 lbs.) at approximately 240° F. is charged to the sodium dispersion preparation tank 5, and 1200 pounds of isooctane run in from storage 14 via line 3 under a pressure of 35 p.s.i.g., whereupon the sodium is dispersed therein at 240° F. via the Gaulin mill 8 to form a uniform dispersion.

An alfin catalyst is prepared by charging 1950 pounds isooctane to the catalyst synthesis reactor 16, after which 550 pounds of the sodium dispersion and 120 pounds of isopropyl alcohol are added, with agitation and cooling to maintain approximately 150° F. The alcohol is added over a three hour period. One-third of the sodium is thereby converted to sodium isoperoxide. Then, over a five hour period 190 pounds of butyl chloride is added, converting most of the remaining sodium to equimolar quantities of sodium butyl and sodium chloride. After addition of the butyl chloride is complete, the recation is completed by stirring for a further hour.

Next, 95 pounds of propylene is added, converting sodium butyl to sodium allyl, with the formation of butane as a byproduct. This is retained in the system as low boiling diluent.

Catalyst thus prepared is fed to the first reactor 31 via line 23 at a rate to supply 202.2 pounds catalyst solids per hour. Dry dilute butadiene derived from cracking ethane was used having the composition:

| | Mol percent |
|---|---|
| Butadiene | 38.7 |
| n-Butane | 5.5 |
| Iso-butene and butene-1 | 44.3 |
| Trans-butene-2 | 6.4 |
| Cis-butene-2 | 4.0 |
| n-Pentane | p.p.m. 500 |
| Iso-butane | 1.1 |
| Acetylenes | p.p.m. 70 |

Wet makeup butadiene is dried and freed of inhibitor in the stripping system of 24. The dry makeup butadiene is charged continuously via line 33, and dry makeup styrene via line 25, at the rates shown in Table I. The combined rate of addition of all streams including the recovered and recycled low boiling diluent stream, line 74, exclusive of catalyst and moderator, as charged to the reactor are shown in the table. 1,4-dihydronaphthalene is added as a moderator. The combined rate of addition of catalyst and moderator is shown in the table. All of the streams are fed in at approximately 100° F.

The two reactors 31, 31' are cooled by reflux cooling, by reflux of low boiling butanes and butenes, condensing the vapors to temperatures of 116 to 108° F. with cold water, and then recirculating the butane and butene condensate to the reactors, so as to maintain a reaction temperature of from about 125 to about 112° F. in the reactors, with a temperature at reactor 31 of about 125° F. and at reactor 31' of about 112° F. The reactore are operated with a vapor space. The pressure in the reactors is 75 to 65 p.s.i.g. The reaction mixture is fed in sequence from reactor to reactor, and the total travel and reaction time is two hours.

The reaction mixture effluent in line 40 has the composition shown in the table, and contains about 12 weight percent alfin rubber. It is blended with antioxidant solution at a rate of 1050 pounds per hour, and is fed at a rate of 47,804 pounds per hour to the first solvent stripper 41, where it is blended with about 82,250 pounds per hour of hot water. This crumb former operates at 160°–180° F. at 70 p.s.i.g. pressure. Steam at a rate of 6260 pounds per hour is injected to heat the suspension while the mixture is intensely agitated. The isooctane, the high boiling solvent, flashes off, together with butadiene, butenes, styrene, isopropanol, and propylene. Over 95% of the volatiles is removed in the first stripper. The composition of the vapor stream in line 42 is given in the table. Isooctane, butadiene, styrene, butanes and butenes are dried, condensed, separated in the fractionator system 43 and 70 and recycled. Heavy ends are removed in the fractionation system of 43, and are purged.

A 6 weight percent rubber crumb in water results, having the composition shown in the table. This slurry is drawn off at the bottom of the stripper 41 via line 48, and is sent to the second stage low pressure stripper or crumb former 41', where the steam distillation is repeated, at 1 p.s.i.g. and 215° F. The aqueous slurry of rubber emerging from this crumb former has the solvent content reduced to approximately 1 weight percent based on the rubber. The overhead vapor stream in line 42' is condensed at 57, and flows to the decanter and liquid-gas disengager 68. The water phase is rejected, and the organic phase is charged to the fractionator system 43, where high boiling solvent is recovered and alcohol and heavy ends are purged. The rubber crumb contains only small amounts of molecular weight moderator and volatiles.

The crumb slurry from the solvent stripper 41' passes through the screen separator 52, removing rubber crumb which floates to the surface of the vessel. The liquid in the lower portion is recycled to the first crumb former 41.

The rubber crumb in the form of small particles containing approximately 60 weight percent water is raked off, and enters the dewatering screen 56, where it is contacted with a stream of cold water at a rate of approximately 13 gallons per minute. This cools the crumb, prevents clogging of the screen, and reduces salt content.

The underflow, consisting of water and a small amount of rubber fines, is pumped to the fines settler 55, where the rubber crumb overflows from the upper portion of the vessel back onto the screen 56. The underflow is purged. The rubber crumb discharged from the screen is fed by the conveyor 60 to the expeller 61, which reduces the water content by screw compression from 60% to approximately 9%. The rubber crumb then enters the expander 64 where, by compression at several hundred p.s.i., the rubber is heated to approximately 330° F., so that upon discharge from the expander, water as steam and solvent flash off. The product is then baled in the baler 67, and is ready for distribution.

improvement which consists essentially in carrying out the polymerization under reflux in the presence of a solvent at least 90% of which is a low boiling aliphatic hydrocarbon diluent having from three to five carbon atoms and a boiling point at atmospheric pressure within the range from about −44° F. up to 85° F., and the remainder is a high boiling liquid hydrocarbon selected from the group consisting of saturated and monounsaturated aliphatic and cycloaliphatic hydrocarbons having at least six carbon atoms which is a liquid at the reaction temperature and pressure, the low boiling diluent being refluxed in order to remove the heat of reaction and control reaction temperature.

TABLE I.—85/15 BUTADIENE STYRENE RUBBER (LBS./HR.)

| Component | Combined catalyst and moderator to reactor | Total combined butadiene styrene and recycle low boiling diluent to reactor | Reactor effluent | Crumb former overhead vapor | Crumb slurry | Dry dilute butadiene makeup | Dry styrene makeup |
|---|---|---|---|---|---|---|---|
| Acetylenes | | 4.3 | 4.3 | 4.3 | | 0.9 | |
| Propylene | 3.5 | 142.8 | 146.3 | 181 | | | |
| Isobutane | | 691.4 | 691.4 | 691.4 | | 150.8 | |
| Iso and butene-1 | | 27,853 | 27,853 | 27,853 | | 5,862 | |
| Butadiene | | 5,596 | 840 | 840 | | 4,938.3 | |
| n-Butane | 48.2 | 3,748 | 3,796.2 | 3,796 | | 754 | |
| Trans and cis butene-2 | 48.4 | 6,538 | 6,586.4 | 6,624 | 34 | 1,377 | |
| Isopentane | 20.8 | 5 | 25.8 | 47 | Trace | 6.4 | |
| Isopropyl alcohol | | Trace | | 111 | (1) | | |
| Iso-octane | 1,246 | 600 | 1,846 | 2,724 | 34 | | |
| Vinyl cyclohexene | 6.3 | 30.1 | 36.4 | 43.7 | 0.8 | 3.2 | |
| Ethyl benzene | 6.3 | 29.5 | 35.8 | 43.6 | 0.9 | | 3.5 |
| Styrene | 1.9 | 927 | 83 | 82.2 | 2.5 | | 884 |
| Dihydronaphthalene | 39.7 | 0.1 | 39.8 | 4.8 | 35 | | |
| Aluminum distearate | 3.1 | | 3.1 | | 3.1 | | |
| Total catalyst solids | 202.2 | | 202.2 | | | | |
| Naphthalene | 0.4 | | 0.4 | | 0.4 | | |
| Water | | | | 620 | 87,900 | | |
| Rubber | | | 5,600 | | 5,600 | | |
| Sodium hydroxide | | | | | 82 | | |
| Inhibitor | Trace | | | | | | |
| Antioxidant | | | | | 28 | | |
| Sodium chloride | | | | | 48.2 | | |
| Totals, lbs./hr | 1,627 | 46,165 | 47,792 | 43,666 | 93,769 | 13,093 | 888 |

[1] Small.

Having regard to the foregoing disclosure, the following is claimed as the inventive and patentable embodiments thereof:

1. In the continuous process for the preparation of alfin polymers from alfin monomers, comprising continuously blending an organic unsaturated alfin monomer, alfin catalyst, molecular weight moderator and solvent, continuously effecting the polymerization of alfin monomer at an elevated temperature at which the reaction proceeds while controlling molecular weight by adjusting the amount of molecular weight moderator, continuously separating volatile materials from the alfin polymer reaction mixture by quenching the reaction mixture in water, and steam distilling such volatile materials from the resulting dispersion, and thereafter recovering solvent and monomer for reuse, and drying the alfin polymer, the

References Cited
UNITED STATES PATENTS

| | | | |
|---|---|---|---|
| 3,067,187 | 12/1962 | Greenberg et al. | 260—94.2 |
| 3,268,501 | 8/1966 | Crouch et al. | 260—94.7 |
| 3,317,437 | 5/1967 | Hoffman et al. | 252—431 |
| 3,380,984 | 4/1968 | Birchell et al. | 260—94.2 |
| 3,535,296 | 10/1970 | Broering | 260—82.1 |

OTHER REFERENCES

Schildknecht: "Polymer Process, Interscience Publishers Inc., New York, N.Y., 1956 (p. 175 relied on).

JOSEPH L. SCHOFER, Primary Examiner
W. F. HAMROCK, Assistant Examiner

U.S. Cl. X.R.
260—83.7, 93.5 S, 94.2 M